(12) United States Patent
Zogg et al.

(10) Patent No.: US 11,673,383 B2
(45) Date of Patent: Jun. 13, 2023

(54) METHOD OF MANUFACTURING A SHEET-LIKE COMPOSITE PART WITH IMPROVED COMPRESSION STRENGTH

(71) Applicant: MITSUBISHI CHEMICAL ADVANCED MATERIALS NV, Tielt (BE)

(72) Inventors: Markus Zogg, Zurich (CH); Davi Montenegro, Zurich (CH); Burak Baser, Aarburg (CH)

(73) Assignee: Mitsubishi Chemical Advanced Materials NV, Tielt (BE)

( * ) Notice: Subject to any disclaimer, the term of this patent is extended or adjusted under 35 U.S.C. 154(b) by 0 days.

(21) Appl. No.: 17/284,583

(22) PCT Filed: Oct. 10, 2019

(86) PCT No.: PCT/EP2019/077547
§ 371 (c)(1),
(2) Date: Apr. 12, 2021

(87) PCT Pub. No.: WO2020/074678
PCT Pub. Date: Apr. 16, 2020

(65) Prior Publication Data
US 2021/0347158 A1 Nov. 11, 2021

(30) Foreign Application Priority Data

Oct. 10, 2018 (EP) ...................................... 18199755
Oct. 11, 2018 (EP) ...................................... 18199756

(51) Int. Cl.
*B32B 37/02* (2006.01)
*B32B 5/26* (2006.01)
(Continued)

(52) U.S. Cl.
CPC .............. *B32B 37/02* (2013.01); *B32B 5/022* (2013.01); *B32B 5/024* (2013.01); *B32B 5/275* (2021.05);
(Continued)

(58) Field of Classification Search
CPC .......... B32B 2307/718; B32B 2262/02; B32B 2250/40; B32B 2250/20; B32B 38/0004;
(Continued)

(56) References Cited

U.S. PATENT DOCUMENTS

| | | |
|---|---|---|
| 4,552,793 A | 11/1985 | Cameron et al. |
| 4,950,355 A | 8/1990 | Klose |

(Continued)

FOREIGN PATENT DOCUMENTS

| | | | |
|---|---|---|---|
| DE | 3701592 A1 | 8/1988 | |
| EP | 0249261 A1 | 12/1987 | |

(Continued)

OTHER PUBLICATIONS

Related U.S. Appl. No. 17/284,665, filed Apr. 12, 2021.

*Primary Examiner* — Vishal I Patel
(74) *Attorney, Agent, or Firm* — Brooks Kushman P.C.

(57) ABSTRACT

Sheet-like composite parts are manufactured by:
a) providing a substantially planar arrangement (A, B, A') comprising a core layer (B) of a fleece material made of fleece thermoplastic fibers and reinforcement fibers, sandwiched between a pair of skin layers (A, A'), of a skin thermoplastic and optionally reinforcing fibers, the faces of the core layers adjacent and substantially parallel the skin layers,
b) heating and pressing the sandwich arrangement (A,B, A') followed by cooling, thereby obtaining the composite part, wherein the compression strength of the composite part is improved by selecting a core layer
(Continued)

(B) which is a core layer having reinforcement fibers predominantly oriented in a direction (Z) perpendicular to the first and second faces.

11 Claims, 2 Drawing Sheets

(51) Int. Cl.
    *B32B 5/02*     (2006.01)
    *B32B 38/00*     (2006.01)

(52) U.S. Cl.
    CPC ...... *B32B 38/0004* (2013.01); *B32B 2250/20* (2013.01); *B32B 2250/40* (2013.01); *B32B 2262/02* (2013.01); *B32B 2307/718* (2013.01)

(58) Field of Classification Search
    CPC ......... B32B 5/024; B32B 5/022; B32B 5/275; B32B 37/02
    See application file for complete search history.

(56) References Cited

U.S. PATENT DOCUMENTS

| | | |
|---|---|---|
| 5,322,875 A | 6/1994 | Dages |
| 5,981,024 A | 11/1999 | Noergaard et al. |
| 7,998,442 B2 | 8/2011 | Pohlmann |
| 2001/0006716 A1 | 7/2001 | Brandt et al. |
| 2010/0064491 A1* | 3/2010 | Dumas ................. D04H 13/00 28/100 |

FOREIGN PATENT DOCUMENTS

| | | | |
|---|---|---|---|
| EP | 1461484 A1 | | 12/2001 |
| EP | 1657375 A1 | | 5/2006 |
| SE | 1450978 A1 | * | 3/2016 |
| SE | 1450978 A1 | | 3/2016 |
| WO | 9416162 A1 | | 7/1994 |
| WO | 03056087 A1 | | 7/2003 |
| WO | 2006105682 A1 | | 10/2006 |
| WO | 2006133586 A1 | | 12/2006 |
| WO | 2015117799 A1 | | 8/2015 |

* cited by examiner

METHOD OF MANUFACTURING A SHEET-LIKE COMPOSITE PART WITH IMPROVED COMPRESSION STRENGTH

CROSS-REFERENCE TO RELATED APPLICATION

This application is the U.S. National Phase of PCT Appln. No. PCT/EP2019/077547 filed Oct. 10, 2019, which claims priority to European Application No. EP 18199755.2 filed Oct. 10, 2018 and European Application No. EP 18199756.0 filed Oct. 11, 2018, the disclosures of which are incorporated in their entirety by reference herein.

FIELD OF THE INVENTION

The present invention relates to a novel method of manufacturing a sheet-like composite part with improved compression strength.

BACKGROUND OF THE INVENTION

Composite parts made of fiber reinforced thermoplastics are being widely used in many technical fields.

For example, WO 2015/117799A1 discloses a composite part comprising a foam core that has a first and second skin layer which are bonded to the foam core on a first surface and a second surface thereof, respectively. Similarly, WO 2006/133586 discloses a flexurally rigid composite sheet comprising one or two skin layers with a thickness of 0.5 to 5 mm made of glass-fiber reinforced polypropylene with a glass content of 20 to 60 wt-% and an air voids content of less than 5 vol-%, and a core layer with a thickness of 2 to 40 mm made of glass-fiber reinforced polypropylene with a glass content of 35 to 80 wt-% and an air voids content of 20 to 80 vol-%. Such porous core sheets can be formed by dry blending of polypropylene fibers and glass fibers, needling of the blended nonwoven, and heat pressing, as extensively described in WO 2006/105682 A1.

A permanent challenge lies in seeking to optimize mechanical properties while keeping the weight as small as possible. In many situations it would be desirable to carry out the manufacturing process with a comparatively thick core layer. Simple up-scaling of core layer thickness leads to the drawback of an initially soft core layer which does not provide sufficient compression strength at the moment when skin layers are being applied in a heat pressing step. It would thus be desirable to provide an improved manufacturing process involving a core layer with improved compression strength.

SUMMARY OF THE INVENTION

According to the invention, there is provided a method of manufacturing a sheet-like composite part, comprising the following process steps:
a) providing a substantially planar arrangement (A, B, A') comprising a core layer (B) sandwiched between a pair of skin layers (A, A'), a first face of the core layer being adjacent and substantially parallel to a first one (A) of said skin layers and a second face of the core layer being adjacent and substantially parallel to the other one (A') of said skin layers, the skin layers (A, A') each comprising a skin thermoplastic and optionally reinforcement fibers, the core layer (B) comprising a fleece material made of fleece thermoplastic fibers and reinforcement fibers,
b) heating and pressing the sandwich arrangement (A,B,A') followed by cooling, thereby obtaining the composite part.

DETAILED DESCRIPTION OF THE PREFERRED EMBODIMENTS

The term "skin layer" shall be understood in its broadest terms as referring to a surface layer attached to an inner or core structure. The upper and lower skin layers may or may not have equal thickness. Each one of the skin layers comprises a thermoplastic material called here "skin thermoplastic" for clarity. Moreover, each skin layer optionally comprises reinforcement fibers.

The core layer is formed of a fleece material made of thermoplastic fibers and reinforcement fibers. For clarity, the material making up the thermoplastic fibers will be called here "fleece thermoplastic".

Fiber reinforced thermoplastic fleece materials as the one making up the core layer are widely used in many technical areas, particularly for producing lightweight form parts with advantageous structural properties. They are typically produced with well established carding or air-laying technologies and are basically formed as sheets. As a consequence of the production process, the fibers of such fleece materials are mainly oriented in the sheet plane, i.e. in what may be defined as "X-Y-plane". While it is known that needling a fleece material in a direction perpendicular to the sheet plane slightly increases the amount of reinforcement fibers oriented in Z-direction, the reorienting effect is relatively small and therefore X-Y-orientation remains dominant.

According to the invention, however, the core layer B is a Z-oriented core layer having reinforcement fibers that are predominantly oriented in an orientation direction Z perpendicular to the first and second faces. In this manner, a substantially improved compression strength is achieved.

It should be emphasized that the above mentioned feature "predominant Z-orientation", i.e. perpendicular to a reference X-Y-plane defined by said first and second faces does not rule out a second direction of preferential orientation, i.e. one specific in-plane direction such as Y. Definitely, however, it implies a predominance in Z-direction compared to an isotropic situation.

According to an advantageous embodiment (claim 2), the Z-oriented core layer (B) is formed by:
i) providing at least one sheet of a pre-consolidated low weight reinforced thermoplastic with an upper face, a lower face and a sheet thickness (T);
ii) cutting the sheet into a plurality of substantially congruent core stripes each having a stripe length (L) and a stripe width (W), each core stripe comprising an upper face portion and a lower face portion spaced apart by a stripe thickness corresponding to said sheet thickness (T);
iii) arranging the core stripes in a face-on-face manner, optionally with a separation layer therebetween, thereby forming a core stack with a stack length ($L_{stack}$) corresponding to said stripe length (L), with a stack height ($H_{stack}$) corresponding to said stripe width (W) and with a stack width stack) ($W_{stack}$) corresponding to a multiple of said stripe thickness (T);
optionally repeating steps i) to iii) to form further core stacks;
whereby said at least one core stack forms said Z-oriented core layer with exposed first and second faces for applying thereto surface layers (A) and (A') to form said sandwich arrangement (A, B, A') for subsequent process step b).

In simple words, a rotation of core stripes leads to a geometric reorientation resulting in said desired predominant Z-orientation.

The term "substantially congruent" shall be understood in the sense that each pair of core stripes to be arranged adjacently to each other have substantial surface portions matching each other. It shall include the possibility that one member or a pair has a larger surface than the other, thus leaving a non-contacting portion. This allows forming a sandwich arrangement with non-constant thickness.

According to one embodiment (claim 3), a separation layer is applied in step iii), particularly a reinforcement fabric.

According to one embodiment (claim 4), the Z-oriented core layer comprises a single core stack.

According to another embodiment (claim 5), the Z-oriented core layer comprises at least two core stacks, optionally having different stack heights ($H_{stack1}$, $H_{stack2}$).

According to a further embodiment (claim 6), at least one core stack comprises core stripes with different compositions.

According to a particularly advantageous embodiment (claim 7), the pre-consolidated low weight reinforced thermoplastic has a reinforcement fiber content of 35 to 80 wt-% and an air voids content of 20 to 80 vol-%.

According to one embodiment (claim 8), the core stripes are heated before being arranged into a core stack for subsequently applying skin layers (A, A') and carrying out process step b).

According to an alternative embodiment (claim 9), unheated core stripes are arranged into a core stack, followed by applying skin layers (A, A') and carrying out process step b).

As known in the field of fiber reinforced thermoplastics (claim 10), the reinforcement fibers can be selected from a large variety, including but not limited to glass fibers, carbon fibers, aramid fibers, basalt fibers and natural fibers. Alternatively, the reinforcement fibers may be made of a high-melting thermoplastic, i.e. from a material that does not melt at the processing temperatures of the heat pressing step. According to an advantageous embodiment, the reinforcement fibers are glass fibers.

The fleece thermoplastic and the skin thermoplastic can be independently selected from a variety of known polymers such as e.g. polypropylene (PP), polyetherimide (PEI), polysulfone (PSU), polyethersulfone (PES), polyphenylenesulfone (PPSU), polyphthalamide (PPA), polyphenylenether (PPO), polyetheretherketone (PEEK) polyphenylene sulfide (PPS), polyamide (PA), polyaryletherketone (PAEK), polyetherketoneketone (PEKK) and polycarbonate (PC) (claim 11). Advantageously, the fleece thermoplastic and the skin thermoplastic are identical or mutually compatible thermoplastic polymers.

In many advantageous embodiments, the reinforcement fibers are carbon fibers and the fleece thermoplastic and skin thermoplastic are PP, preferably a polypropylene with a melt flow index MFI (230° C., 2.16 kg) of 5 to 500, preferably of 10- to 200 g/10 min.

In certain embodiments, at least one skin layer (A, A') comprises a reinforcement sheet consisting of a woven fabric, non-crimp fabric or a unidirectional fiber arrangement.

Depending on application, the core layer (B) provided before processing step b) has an areal weight of 250 to 10,000 g/m².

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawings, wherein.

It will be understood that the figures are not necessarily drawn to scale. In some instances, relative dimensions are substantially distorted for ease of visualization. Identical or corresponding features in the various figures will generally be denoted with the same reference numerals.

Figure 1:
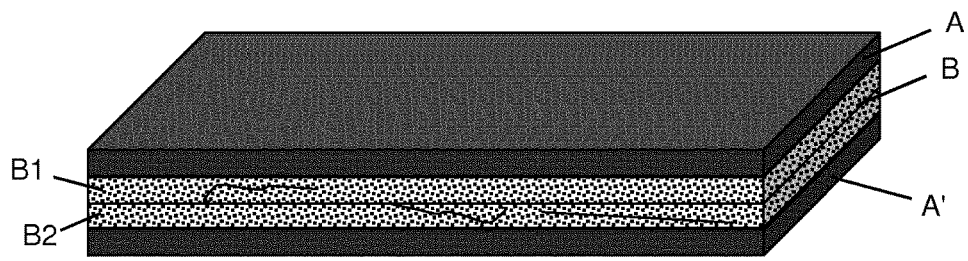
FIG. 1 shows an arrangement to be processed according to prior art, as a perspective view.
Figure 2:
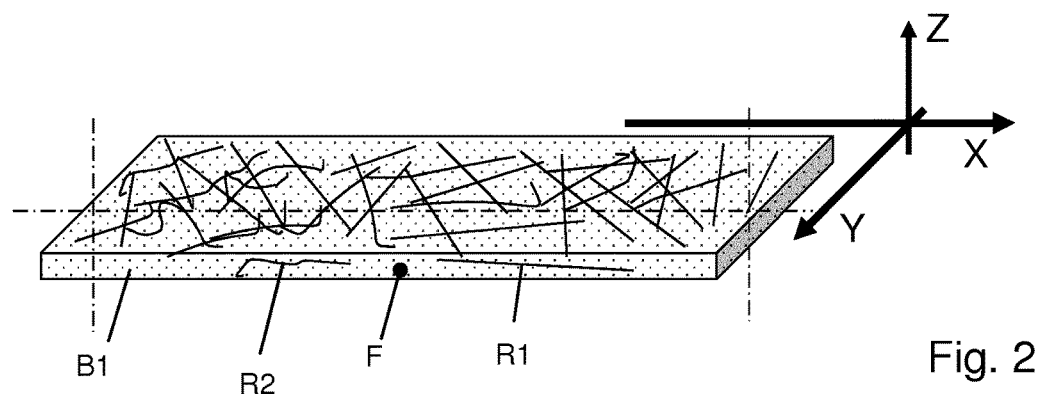
FIG. 2 shows a core layer of the arrangement of FIG. 1, also as a perspective view.

A method of manufacturing a sheet-like composite part according to prior art is shown in FIGS. 1 and 2. As generally shown in FIG. 1, the method starts by providing a substantially planar arrangement (A, B, A') comprising a core layer B sandwiched between a pair of skin layers, namely an upper skin layer A and a lower skin layer A'. In the example shown, the core layer B is made up of two individual layers B1 and B2 stacked on top of each other.

A first face of the core layer B is adjacent and substantially parallel to the upper skin layer A whereas the second face of the core layer is adjacent and substantially parallel to the lower skin layer A'.

The two skin layers A, A' each comprise a skin thermoplastic and optionally reinforcement fibers. The core layer B, i.e. each one of the individual layers B1 and B2, comprises a fleece material F made of fleece thermoplastic fibers and further comprising reinforcement fibers R1, R2, etc.

As illustrated in FIG. 2, the orientation of reinforcement fibers R1, R2, etc. in each core layer is predominantly in the layer plane, i.e. in the plane spanned by directional vectors X and Y. More precisely, the reinforcement fibers are oriented in such manner that their longitudinal fiber direction does not have a substantial component in the out-of-plane direction Z. It should be noted that this also applies to curved fibers, in which case one has to consider the local fiber direction at any point along the fiber.

Figure 3:
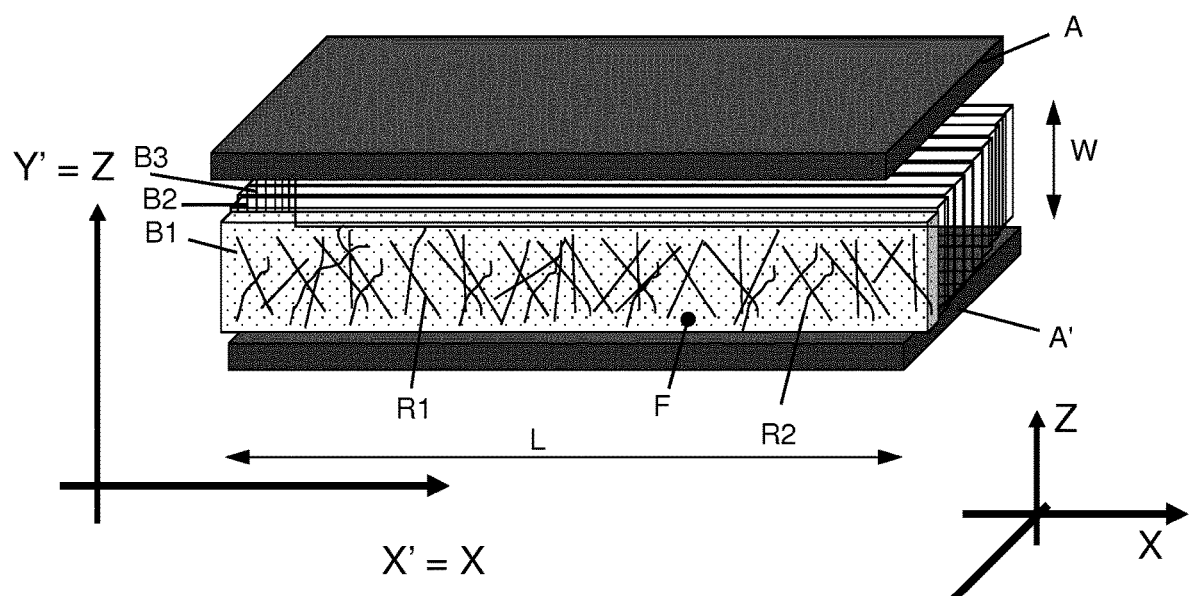
FIG. 3 shows an arrangement to be processed according to a first embodiment, as a perspective lateral view.
Figure 4:
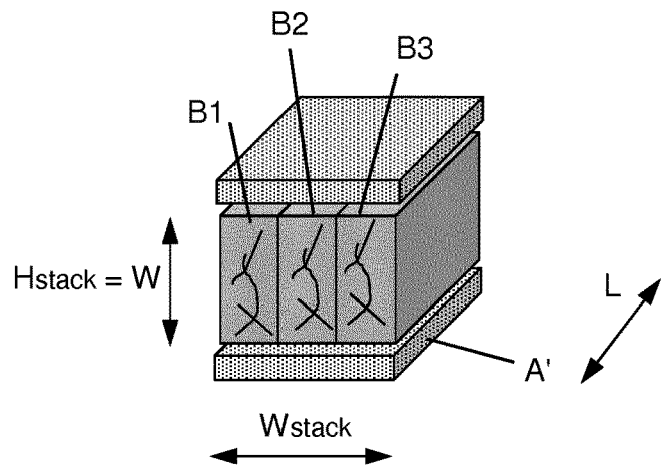
FIG. 4 shows an arrangement similar to that of FIG. 3, but with just three core stripes, as a perspective longitudinal view.

The basic concept of the present invention is now illustrated in FIGS. 3 and 4. In contrast to the situation shown in FIGS. 1 and 2, there is now a substantial amount of reinforcement fibers R1, R2, etc. having a directional component perpendicular to the faces of the core layer, i.e. along the out-of-plane direction Z. In the example shown in FIGS. 3 and 4, this is achieved by having the core layer B made up by a plurality of substantially congruent core stripes B1, B2, B3, etc. all consisting of a material which is the same as or is similar to the one used for the core layer exemplified in FIG. 2. But in contrast to the arrangement shown in FIG. 1, the core stripes are oriented with their planes being perpendicular to the skin layers A and A'. This is achieved by flipping each core stripe by 90°.

More specifically, the Z-oriented core layer B of the arrangement shown in FIGS. 3 and 4 can be formed by the following method. First, one provides a pre-consolidated low-weight reinforced thermoplastic (also called "LWRT") with an upper face, a lower face and a sheet thickness T. Subsequently, this sheet is cut into a plurality of substantially congruent core stripes each having a stripe length L and a stripe width W and further comprising an upper face portion and a lower face portion spaced apart by a stripe thickness corresponding to the sheet thickness T. The core stripes are then arranged in a face-on-face manner, thereby forming a core stack with a stack length $L_{stack}$ corresponding to the stripe length L, and with a stack height $H_{stack}$ corresponding to the stripe width W. Evidently, the stack has a stack width $W_{stack}$ corresponding to a multiple of the individual stripe thickness T. The core stack thus obtained forms a Z-oriented core layer with exposed first and second faces for applying thereto surface layers A and A'.

The sandwich arrangement A, B, A' thus obtained can then be subjected to a heating and pressing step followed by cooling, thereby obtaining a sheet-like composite part with excellent compression strength properties.

Figure 5:
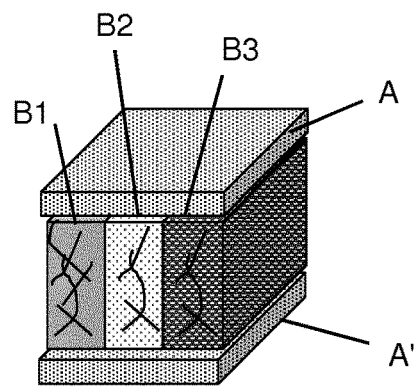
FIG. 5 shows an arrangement to be processed according to a second embodiment with non-identical core stripes, as a perspective longitudinal view.

A second embodiment is exemplified in FIG. 5. In this case, an arrangement with non-identical LWRT core stripes B1, B2, B3 is used. These core stripes have substantially identical geometry, but they do not all have the same composition. For example, the various core stripes could have somewhat different fiber content and/or somewhat different porosity. It is also possible to use core stripes with different types of reinforcement fibers, e.g. some stripes with carbon fibers and other stripes with glass fibers.

Figure 6:
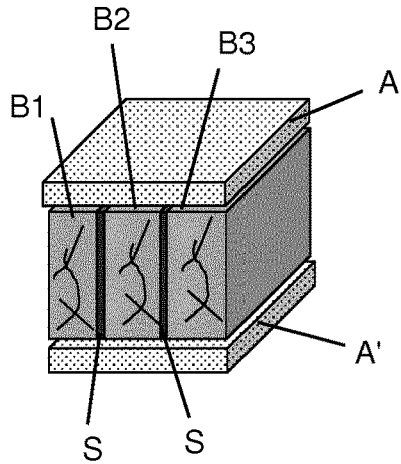
FIG. 6 shows an arrangement to be processed according to a third embodiment with separation layers between core stripes, as a perspective longitudinal view.

A third embodiment is exemplified in FIG. 6. In this case, an arrangement with substantially identical LWRT core stripes B1, B2, B3 is used. However, the arrangement further comprises separation layers S, particularly fabric layers, arranged between the core stripes.

Figure 7:
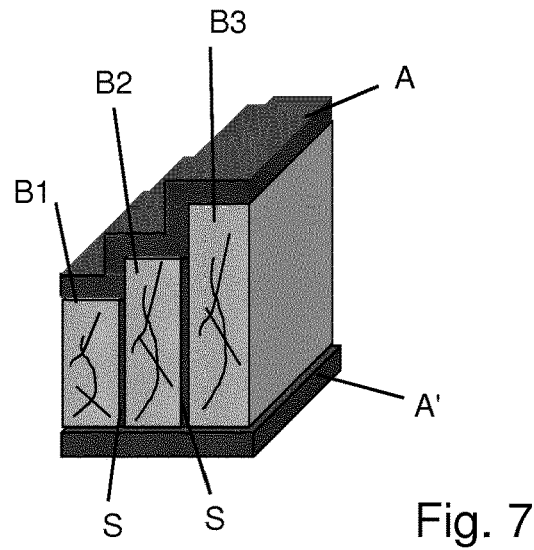
FIG. 7 shows an arrangement to be processed according to a fourth embodiment with non-identical core stripe heights, as a perspective longitudinal view.

A fourth embodiment is shone in FIG. 7. In this case, an arrangement having three LWRT core stripes B1, B2, B3 having different stripe heights is used. The core stripes are substantially, but not strictly congruent. In the particular example shown, the stripe height progressively increases, thereby forming a stair-like configuration, resulting in a progressively increasing thickness of the sandwich arrangement. Other geometric configurations are of course possible and useful.

The invention claimed is:

1. A method of manufacturing a sheet-like composite part, comprising the following process steps:
   a) providing a substantially planar arrangement (A, B, A') comprising a core layer (B) sandwiched between a pair of skin layers (A, A'), a first face of the core layer being adjacent and substantially parallel to a first one (A) of said skin layers and a second face of the core layer being adjacent and substantially parallel to the other one (A') of said skin layers, the skin layers (A, A') each comprising a skin thermoplastic and optionally reinforcement fibers, the core layer (B) comprising a fleece material made of fleece thermoplastic fibers and reinforcement fibers,
   b) heating and pressing the sandwich arrangement (A,B, A') followed by cooling, thereby obtaining the composite part,
   wherein
   the core layer (B) is a Z-oriented core layer having reinforcement fibers that are predominantly oriented in an orientation direction (Z) perpendicular to the first and second faces, and
   said Z-oriented core layer (B) is formed by:
   i) providing at least one sheet of a pre-consolidated low weight reinforced thermoplastic with an upper face, a lower face and a sheet thickness (T);
   ii) cutting the sheet into a plurality of substantially congruent core stripes each having a stripe length (L) and a stripe width (W), each core stripe comprising an upper face portion and a lower face portion spaced apart by a stripe thickness corresponding to said sheet thickness (T);
   iii) arranging the core stripes in a face-on-face manner, optionally with a separation layer therebetween, thereby forming a core stack with a stack length ($L_{stack}$) corresponding to said stripe length (L), with a stack height ($H_{stack}$) corresponding to said stripe width (W) and with a stack width ($W_{stack}$) corresponding to a multiple of said stripe thickness (T);
   optionally repeating steps i) to iii) to form further core stacks;
   whereby said at least one core stack forms said Z-oriented core layer with exposed first and second faces for applying thereto surface layers (A) and (A') to form said sandwich arrangement (A, B, A') for subsequent process step b), and
   wherein said pre-consolidated low weight reinforced thermoplastic has a reinforcement fiber content of 35 to 80 wt-% and an air voids content of 20 to 80 vol-%.

2. The method according to claim 1, wherein a separation layer is present, and the separation layer is a reinforcement fabric.

3. The method according to claim 1, wherein the Z-oriented core layer comprises a single core stack.

4. The method according to claim 1, wherein the Z-oriented core layer comprises at least two core stacks, the core stacks optionally having different stack heights ($H_{stack1}$, $H_{stack2}$).

5. The method according to claim 1, wherein at least one core stack comprises core stripes with different compositions.

6. The method according to claim 1, wherein the core stripes are heated before being arranged into a core stack for subsequently applying skin layers (A, A') and carrying out process step b).

7. A method of manufacturing a sheet-like composite part, comprising the following process steps:
   a) providing a substantially planar arrangement (A, B, A') comprising a core layer (B) sandwiched between a pair of skin layers (A, A'), a first face of the core layer being adjacent and substantially parallel to a first one (A) of said skin layers and a second face of the core layer being adjacent and substantially parallel to the other one (A') of said skin layers, the skin layers (A, A') each comprising a skin thermoplastic and optionally reinforcement fibers, the core layer (B) comprising a fleece material made of fleece thermoplastic fibers and reinforcement fibers,
   b) heating and pressing the sandwich arrangement (A,B, A') followed by cooling, thereby obtaining the composite part,
   wherein
   the core layer (B) is a Z-oriented core layer having reinforcement fibers that are predominantly oriented in an orientation direction (Z) perpendicular to the first and second faces, and said Z-oriented core layer (B) is formed by:
i) providing at least one sheet of a pre-consolidated low weight reinforced thermoplastic with an upper face, a lower face and a sheet thickness (T);
ii) cutting the sheet into a plurality of substantially congruent core stripes each having a stripe length (L) and a stripe width (W), each core stripe comprising an upper face portion and a lower face portion spaced apart by a stripe thickness corresponding to said sheet thickness (T);
iii) arranging the core stripes in a face-on-face manner, optionally with a separation layer therebetween, thereby forming a core stack with a stack length ($L_{stack}$) corresponding to said stripe length (L), with a stack height ($H_{stack}$) corresponding to said stripe width (W) and with a stack width ($W_{stack}$) corresponding to a multiple of said stripe thickness (T);
optionally repeating steps i) to iii) to form further core stacks;
whereby said at least one core stack forms said Z-oriented core layer with exposed first and second faces for applying thereto surface layers (A) and (A') to form said sandwich arrangement (A, B, A') for subsequent process step b), and
wherein unheated core stripes are arranged into a core stack, followed by applying skin layers (A, A') and carrying out process step b).

8. The method according to claim 1, wherein said reinforcement fibers are selected from the group consisting of glass fibers, carbon fibers, aramid fibers, basalt fibers, natural fibers, high-melting thermoplastic fibers, and mixtures thereof.

9. The method according to claim 1, wherein said fleece thermoplastic and said skin thermoplastic are independently selected from the group consisting of PP, PEI, PES, PSU, PPSU, PPA, PPO, PEEK, PPS, PA, PEAK, PEKK, PC and mixtures thereof.

10. The method according to claim 1, wherein at least one skin layer (A, A') comprises a reinforcement sheet consisting of a woven fabric, non-crimp fabric or a unidirectional fiber arrangement.

11. A method of manufacturing a sheet-like composite part, comprising the following process steps:
a) providing a substantially planar arrangement (A, B, A') comprising a core layer (B) sandwiched between a pair of skin layers (A, A'), a first face of the core layer being adjacent and substantially parallel to a first one (A) of said skin layers and a second face of the core layer being adjacent and substantially parallel to the other one (A') of said skin layers, the skin layers (A, A') each comprising a skin thermoplastic and optionally reinforcement fibers, the core layer (B) comprising a fleece material made of fleece thermoplastic fibers and reinforcement fibers,
b) heating and pressing the sandwich arrangement (A, B, A') followed by cooling, thereby obtaining the composite part,
wherein
the core layer (B) is a Z-oriented core layer having reinforcement fibers that are predominantly oriented in an orientation direction (Z) perpendicular to the first and second faces, and
said Z-oriented core layer (B) is formed by:
i) providing at least one sheet of a pre-consolidated low weight reinforced thermoplastic with an upper face, a lower face and a sheet thickness (T);
ii) cutting the sheet into a plurality of substantially congruent core stripes each having a stripe length (L) and a stripe width (W), each core stripe comprising an upper face portion and a lower face portion spaced apart by a stripe thickness corresponding to said sheet thickness (T);
iii) arranging the core stripes in a face-on-face manner, optionally with a separation layer therebetween, thereby forming a core stack with a stack length ($L_{stack}$) corresponding to said stripe length (L), with a stack height ($H_{stack}$) corresponding to said stripe width (W) and with a stack width ($W_{stack}$) corresponding to a multiple of said stripe thickness (T);
optionally repeating steps i) to iii) to form further core stacks;
whereby said at least one core stack forms said Z-oriented core layer with exposed first and second faces for applying thereto surface layers (A) and (A') to form said sandwich arrangement (A, B, A') for subsequent process step b), and
wherein the core layer (B) provided before processing step b) has an areal weight of 250 to 10,000 g/m².

* * * * *